J. BARTOO.
EXCAVATOR.
No. 32,494. Patented June 4, 1861.
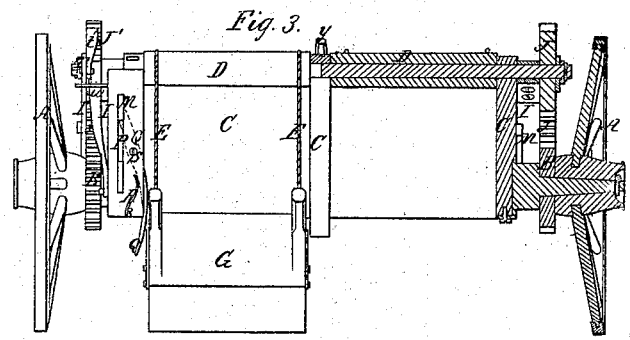
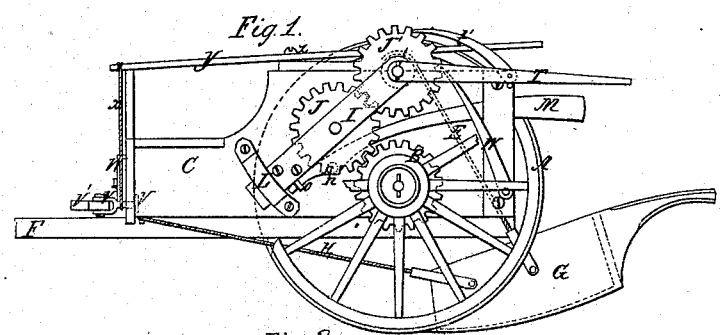
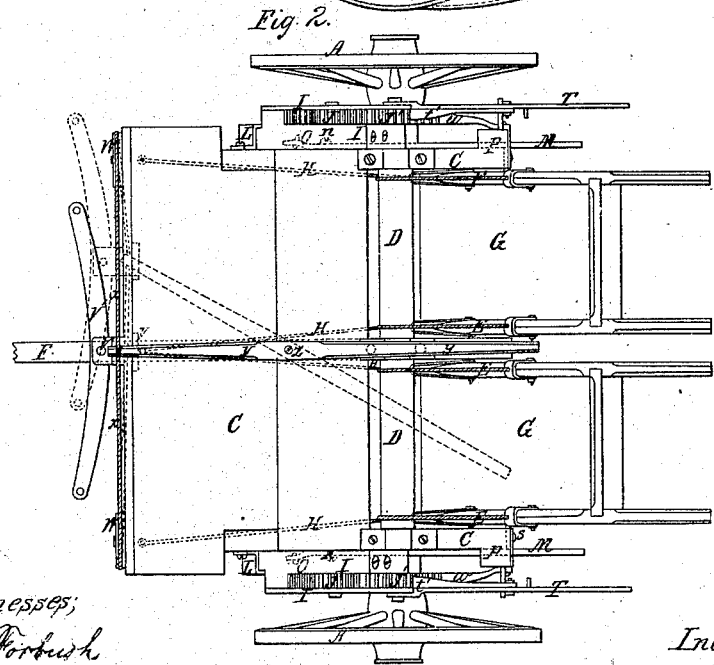
Witnesses:
W. H. Forbush
E. B. Forbush
Inventor:
Jesse Bartoo

UNITED STATES PATENT OFFICE.

JESSE BARTOO, OF EAST AURORA, NEW YORK, ASSIGNOR TO HIMSELF AND ZINA A. HEMSTREET, OF SAME PLACE.

EXCAVATOR.

Specification of Letters Patent No. 32,494, dated June 4, 1861.

*To all whom it may concern:*

Be it known that I, JESSE BARTOO, of East Aurora, Erie county, and State of New York, (assignor to himself and Z. A. Hemstreet, of the same place,) have invented certain new and useful Improvements in Excavators; and I do hereby declare that the following is a full, clear, and exact description thereof, reference being had to the accompanying drawings and the letters of reference marked thereon, in which—

Figure I is a side elevation of my improved excavator. Fig. II is a plan of the same. Fig. III is a rear end view, partly in elevation and partly in section.

The nature of my invention relates, 1st, to such arrangement of gear wheels with reference to the windlass and driving wheels and in combination with changing lever and spring catch as that the scraper after being filled and while being raised to its proper position for transportation will move the spring catch in a manner to release its hold upon the lever and let the heavy end of the lever drop and thereby ungear from the driving wheel, and avoid the danger of breaking the windlass chain and other damage by winding up too far. 2d, in the arrangement of the draft bar in such a manner that the line of draft may be changed when each scraper is being filled in order to equalize the resistance and prevent side draft.

Letters of like name and kind refer to like parts in each of the figures.

A represents the driving wheels with spur wheels B permanently attached thereto; C main frame work of the machine; D windlass, with ropes or chains E, for the purpose of raising the scraper to the proper height for transportation when filled; F pole to which the team is attached for the purpose of guiding the machine; G road scraper or excavator of ordinary construction; H draft chains connecting the scrapers to the front part of the main frame; I radial frame hung upon the end of the windlass shaft and supporting the spur wheel J which gears constantly with the spur wheel J′ upon the end of the windlass shaft and the wheel J gears and ungears with the driving spur wheel B as required. The frame I turns or swings upon the end of the windlass shaft a sufficient distance to throw the wheel J in or out of gear with the wheel (B) as required to give motion to or stop the motion of the windlass.

L is a guide connected to the main frame and which holds the lower end of the frame I and guides and steadies it in its movement.

M is a gear changing lever which is supported by its fulcrum ($n$.) The short end of this lever connects with the lower end of the frame I by means of a staple as shown at ($o$) while its long or heavy end moves through a slot in the side piece of the main frame as shown at (P.) This end of the lever is made sufficiently heavy to raise the radial frame I by its own weight.

Q is a catch and R a spring connected therewith. (See Fig. III.) The catch is suspended upon a fulcrum pin as shown at S. When the heavy end of the lever is raised to its highest position (the short end being connected to the frame I) it brings the wheel J down into gear with the wheel B and the lever is supported or held up in that position by the catch Q.

As the scraper is raised by the windlass it presses against the curved portion of the catch in a manner to disconnect it from the lever and let the heavy end of the lever drop and thereby raise the opposite end which being connected to the lower end of the frame I also raises that, it being of sufficient weight for that purpose and thereby ungears the wheels J and B and consequently stops the windlass and the further ascent of the scraper and prevents a possibility of any damage in operating the windlass. Both scrapers are provided with the same devices and each has an independent action of the other.

T is a lever hinged to the end of the windlass shaft outside of the wheel J′ with a pawl $t'$ connected therewith for the purpose of raising the scraper by hand also for using the lever as a brake against the side of the wheel J′ to ease the descent of the scraper to the ground.

$w$ is a dog which catches into the teeth of the wheel J′ and prevents it from turning back.

V is an adjustable draft bar which may be moved laterally to and fro to change the line of draft. It is connected to the front end of the frame in any convenient manner so as to allow of its easy movement. It is represented as working in a horizontal slot in the front cross piece of the main frame; V', whiffletree.

W are pulleys connected to the corners of the frame and X represents a cord or chain which passes around the pulleys and is connected with the draft bar and with the end of the lever Y. The lever Y has its fulcrum at Z. The handle end of this lever extends in proximity with the driver so that by moving the lever he can change the line of draft as desired. This arrangement enables each scraper to be filled separately without causing side draft and each scraper being filled separately the line of draft may then be placed centrally for transportation so that at all times the line of draft may be kept centrally with the resistance or load to be moved. An attendant will manage the scrapers in loading and unloading.

I claim—

1. So arranging the changing lever M, catch Q and spring R with reference to the radial frame I (including gear wheels J, J',) and scraper G that as the scraper is raised it will move the catch in a manner to release its hold upon the lever and allow the heavy end of the lever to drop and thereby ungear with the driving wheel for the purposes and substantially as set forth.

2. The arrangement of the draft bar V in such manner that the line of draft may be changed to correspond with the central line of resistance in combination with two scrapers arranged side by side for the purposes and substantially as described.

JESSE BARTOO.

Witnesses:
  W. H. FORBUSH,
  LAFAYETT BARTOO.